United States Patent [19]
Yokoyama et al.

[11] Patent Number: 5,491,541
[45] Date of Patent: Feb. 13, 1996

[54] DEVELOPING APPARATUS HAVING ADJACENT SIMILAR MAGNETIC POLES

[75] Inventors: Tomoaki Yokoyama, Aichi; Makoto Takase, Toyokawa, both of Japan

[73] Assignee: Minolta Camera Kabushiki Kaisha, Osaka, Japan

[21] Appl. No.: 149,793

[22] Filed: Nov. 10, 1993

[30] Foreign Application Priority Data

Nov. 12, 1992 [JP] Japan .................................. 4-302237
Nov. 12, 1992 [JP] Japan .................................. 4-302290
Nov. 12, 1992 [JP] Japan .................................. 4-302330

[51] Int. Cl.$^6$ .................................................. G03G 15/09
[52] U.S. Cl. ................................... 355/251; 118/658
[58] Field of Search ............................... 355/251, 259, 355/253; 118/656–658, 653; 430/122

[56] References Cited

U.S. PATENT DOCUMENTS

| | | | |
|---|---|---|---|
| 3,939,801 | 2/1976 | Tanaka et al. | 118/658 |
| 4,030,447 | 6/1977 | Takahashi et al. | 118/658 |
| 4,168,901 | 9/1979 | Ito et al. | 118/653 X |
| 4,177,757 | 12/1979 | Murakawa et al. | 118/658 |
| 4,292,921 | 10/1981 | Kroll et al. | 118/657 X |
| 4,331,100 | 5/1982 | Mochizuki et al. | 118/657 |
| 4,425,373 | 1/1984 | Hosono et al. | 118/657 X |
| 4,442,790 | 4/1984 | Swapceinski et al. | 118/657 |
| 4,492,456 | 1/1985 | Haneda et al. | 118/657 X |
| 4,498,755 | 2/1985 | Ohkubo et al. | 118/658 X |
| 4,641,946 | 2/1987 | Forbes, II | 118/658 X |
| 4,780,741 | 10/1988 | Wada et al. | 118/653 |
| 4,911,100 | 3/1990 | Yamashita | 118/658 |
| 4,960,070 | 10/1990 | Nishimura | 118/658 |
| 5,311,262 | 5/1994 | Shimizu et al. | 355/251 |

FOREIGN PATENT DOCUMENTS

| | | | |
|---|---|---|---|
| 59-22072 | 2/1984 | Japan | 355/251 |
| 60-168177 | 8/1985 | Japan | 355/251 |
| 60-203971 | 10/1985 | Japan | 355/251 |
| 63-254471 | 10/1988 | Japan | 355/251 |
| 2-019875 | 1/1990 | Japan | 355/251 |
| 2-077771 | 3/1990 | Japan | 355/251 |
| 3-293680 | 12/1991 | Japan | 355/251 |
| 3-291680 | 12/1991 | Japan | 355/251 |
| 4-029169 | 1/1992 | Japan | 355/251 |
| 4-063381 | 2/1992 | Japan | 355/251 |
| 4-063382 | 2/1992 | Japan | 355/251 |
| 4-240881 | 8/1992 | Japan | 355/251 |
| 5-313497 | 11/1993 | Japan | 355/251 |

*Primary Examiner*—A. T. Grimley
*Assistant Examiner*—Shuk Y. Lee
*Attorney, Agent, or Firm*—Burns, Doane, Swecker & Mathis

[57] ABSTRACT

The present invention is characterized in that two magnetic poles of a magnetic member which are positioned to confront a nipping region between a sleeve and a photoreceptor in neighboring relation with each other are of the same polarity. These neighboring poles of the same polarity produce a distribution of magnetic flux density having first and second local maximum points and a local minimum point therebetween. A central angle $\theta 1$ between a line extending from a center of the magnetic member to the first local maximum point and a line extending the center to the local minimum point is smaller than a central angle $\theta 2$ between the line extending from the center to the local minimum point and a line extending from the center to the second local maximum point. Further, a developer material retained by the magnetic force of attraction generated by the neighboring magnetic poles of same polarity are kept in contact with the electorostatic latent image bearing member.

5 Claims, 8 Drawing Sheets

Fig. 6

| R C | 3 | 7 | 10 | 12 | 15 | 20 | 25 |
|---|---|---|---|---|---|---|---|
| REPRODUC-TIVITY | ○ | ○ | ○ | △ | △ | × | × |

DEVELOPING APPARATUS HAVING ADJACENT SIMILAR MAGNETIC POLES

BACKGROUND OF THE INVENTION

1. Field of the Invention

The present invention relates to a developing apparatus for use in an electrophotographic image forming apparatus such as copying machine, laser beam printer, or faximile, and more particularily to the developing appratus for providing a photoreceptor with toner particles to develop an electrostatic latent image on the photoreceptor into a visible powder image.

2. Description of the Prior Art

One known developing apparatus comprises a developer roller disposed adjacent to an electorostatic latent image bearing member or photoreceptor, which roller consists of a stationary magnetic member having a plurality of magnetic poles on its outer periphery, only one of said magnetic poles confronting to the photoreceptor, and a rotatably supported sleeve enclosing the magnetic member therein. Developer material of two-component type is retained on an outer periphery of the sleeve by the effect of a magnetic force generated by the magnetic member. The developer material on the sleeve is, during a rotation of the sleeve, transported so that the developer material retained by the magnetic pole facing to the photoreceptor is brought into contact with the photoreceptor to develop an electorostatic latent image into a visible powder image.

The prior art developing apparatus has several drawbacks. Namely, since the developer material retained only by the single magnetic pole confronting to the photoreceptor is brought into contact with the photoreceptor, the width of an area of contact of the photoreceptor of the sleeve with respect to the direction of rotation of the sleeve is rather small and, therefore, the density of the developed images varies with change in amount of electric charge of toner which may take place as a result of change in environment. For example, the image density reduces as humidity decreases.

Further, if in order to secure a proper image density the developer material is quite densely retained at the region where the developer roller confronts the photoreceptor, part of toner particle deposited upon the photoreceptor is scratched off by magnetic brush brisles then moving away from the photoreceptor, leaving a mark of scratching the toner deposit on the photoreceptor which eventually result in formation of the developed image having white lines corresponding to the mark of scratches.

Moreover, in a developing apparatus having a regulating plate facing to the periphery of the sleeve with a small gap defined therebetween in order to regulate the amount of the develper material to be transported to the region where the sleeve confronts to the photoreceptor, if foreign matter of a large size such as scraps or lumps of concenrated toner is caught in the gap between the regulating plate and the sleeve, the develper material carried by the sleeve is blocked by the foreign matter, eventually resulting in formation of a defective image bearing undesirable white line.

SUMMARY OF THE INVENTION

It is therefore an object of the present invention to provide an improved developing apparatus for use in an image forming apparatus, which is capable of developing an electrostatic latent image into a visible powder image of high density regardless of a variation in electric charge of toner with change in environment, and also capable of reproducing a high quality image free from scratching tails or defects such as white line.

To achieve above and other objects of the present invention, there is provided a developing apparatus comprising a stationary magnetic member having a plurality of magnetic poles extending in a direction axially of the magnetic member, and a non-magnetic rotatable sleeve enclosing said magnetic member therein. A developer material is retained upon a periphery of the sleeve by the effect of a magnetic force of attraction generated by the magnetic member during a rotation of the sleeve so as to be brought into contact with an electrostatic latent bearing member. The present invention is characterized in that two of the magnetic poles of the magnetic member which are positioned so as to confront a nipping region between the sleeve and a photoreceptor in neighboring relation with each other are of the same polarity. These neighboring poles of the same polarity produce a distribution of magnetic flux density having a local minimum point, a first local maximum point located upstream of the local minimum point with respect to the rotation of the sleeve, and a second local maximum point located downstream of the local minimum point with respect to the rotation of the sleeve. A central angle $\theta_1$ between a line extending from a center of the magnetic member to the first local maximum point and a line extending the center of the magnetic member to the local minimum point is smaller than a central angle $\theta_2$ between the line extending from the center of the magnetic member to the local minimum point and a line extending from the center of the magnetic member to the second local maximum point. Besides, the developer material retained by the magnetic force of attraction generated by the neighboring magnetic poles of same polarity are kept in contact with the electorostatic latent image bearing member.

Alternatively, the neighboring magnetic poles of the same polarity can be magnetized in such a way that a difference between a magnetic flux density of the first local magnetic point and that of local minimum point may be equal to or more than 200 gauss and a rate of change of magnetic flux density from the local minimum point to the second maximum point may be equal to or less than 10 gauss/degree.

Further, the neighboring magnetic poles of the same polarity poles can be magnetized in such a way that magnetic flux densities of the local maximum points and local minimum point may have the following relation:

$$Br(LMAX1) > Br(LMAX2) > Br(LMIN)$$

wherein

Br(LMAX1) is a magnetic flux density at the first local maximum point;

Br(LMAX2) is a magnetic flux density at the second local maximum point; and

Br(LMIN) is a magnetic flux density at the local minimum point.

According to the present invention, a repelent magnetic field formed by the neighboring magnetic poles of the same the polarity provides a reservoir of developer material above the first magnetic pole such that developer material is stirred and efficiently brought into contact with the elctrostatic latent image bearing member to develop an electorostatic latent image formed thereon into a high density image.

Further, if the foreign matter is caught in the gap between the sleeve and the regulating plate so that the developer material is blocked to form a strip like portion where no or little developer material exist, the portion can be covered with developer material in the reservoir to result in an image free from defects such as white line.

The developer material carried to the region confronting to the second magnetic pole, where the magnetic force of attraction is weak, constitutes soft magnetic brushes so that it lightly contacts with the electrostatic latent image bearing member. Therefore, toner powder image visualized by the developer material in the reservoir passes through without being scratched off by the magnetic brush. As a result, a reproduced image free from defects such as scratching tails can be obtained.

In the region extending from the first magnetic pole to the second magnetic pole, where a repelent magnetic field exist, the developer material moves with jumping or without jumping but touching the sleeve in low density or sparsely. At this time, some toner particle may separate from carrier to scatter. However, the developer material retained above the first and second magnetic poles touches the photoreceptor so as to prevent the scattered toner particles from leaking therefrom and the consequent dropping from the developing apparatus.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 6 shows a table showing that a relation between reproductivity of low density original line and a changing rate of a magnetic flux density in the region from local minimum point to a second local maximum point;

DETAILED DESCRIPTION OF THE PREFERRED EMBODIMENTS

Figure 1:
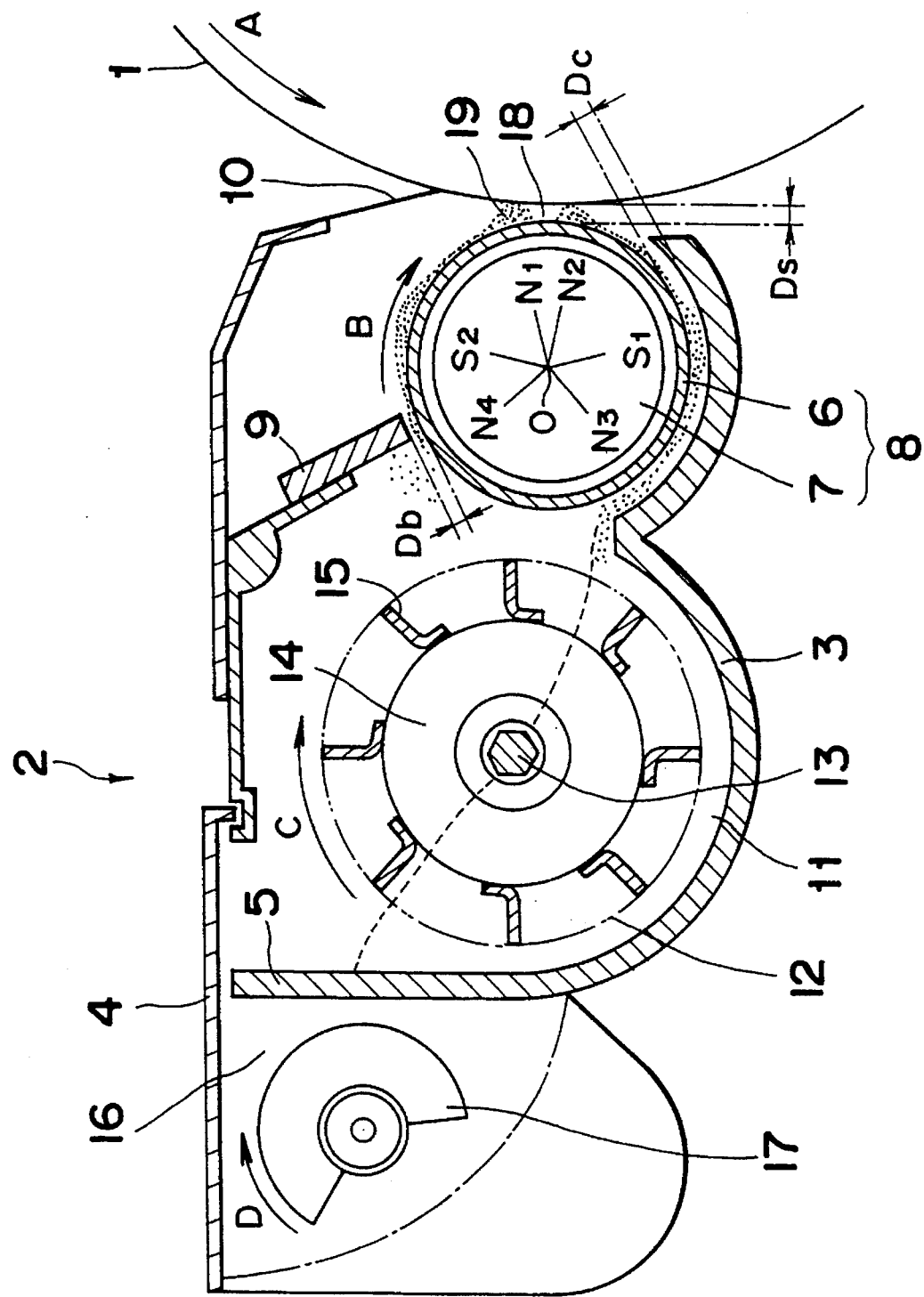
FIG. 1 is a schematic cross sectional view of the developing apparatus according to the present invention.

Referring now to the drawings, there is shown in FIG. 1 a transverse sectional view of a electorostatic latent image bearing member or photoreceptor 1. The photoreceptor 1 comprises a cylindrical body having an organic photosensitive layer on its outer surface, and rotably supported for roation at a velocity of 180 mm/sec in the direction indicated by arrow A by suitable drive means or motor (not shown). Disposed arrounded the photoreceptor 1 are a plurality of image processing stations; that is, a charge station for imparting electric charge to the photosensitive layer, an exposing station for illuminating an image onto the surface of the layer to form an electorostatic latent image to be ultimately visualized, a developing station for providing the electrostatic latent image with toner particles to develop the latent image into a visible toner image, a transfer station for depositing the visible image onto a record material such as paper, a cleaning station for removing residual toner particles from the photoreceptor 1, and an erasing station for removing residual charge in readiness for the next succeeding cycle of copy making.

The developing apparatus 2 of the present invention, which is arranged at the developing station, comprises a developer tank consisting of a lower casing 3 and an upper casing 4, and houses therein a developer roller 8, a mixing roller 12, and a supply roller 17. The developer roller 8 comprises a cylindrical sleeve 6 having a stationary magnetic member 7 therein. The sleeve 6, which is made of electrically conductive, non-magnetizable material such as aluminium formed into a cylinder having a diameter of,.e.g., 24.5 mm, has a multiplicity of fine surface irregularities formed on its outer surface by a sand blast processing, and is rotatably supported for rotation in a direction indicated by arrow B at a revolution rate of 226 rpm. A developing gap Ds of 0.6 mm is defined between the sleeve 6 and the outer surface of the photoreceptor 1; and a clearance Dc of 1.0 mm is defined between the sleeve 6 and an arch-shaped front portion of the lower casing 3. Installed at an inner portion of the upper casing 4 is a magnetic brush bristle height regulating member or plate 9, a free end of which is spaced apart from the upper portion of the sleeve 6 to define an air gap Db of 0.5 mm. Attached at a front portion of the upper casing 4 is a flexible sheet 10 preferably made of polyethylene. This flexible sheet 10 has its free end portion held in contact with the outer surface of the photoreceptor 1 so that dust of the toner particles is prevented from leaking from the developer 2.

Figure 2:
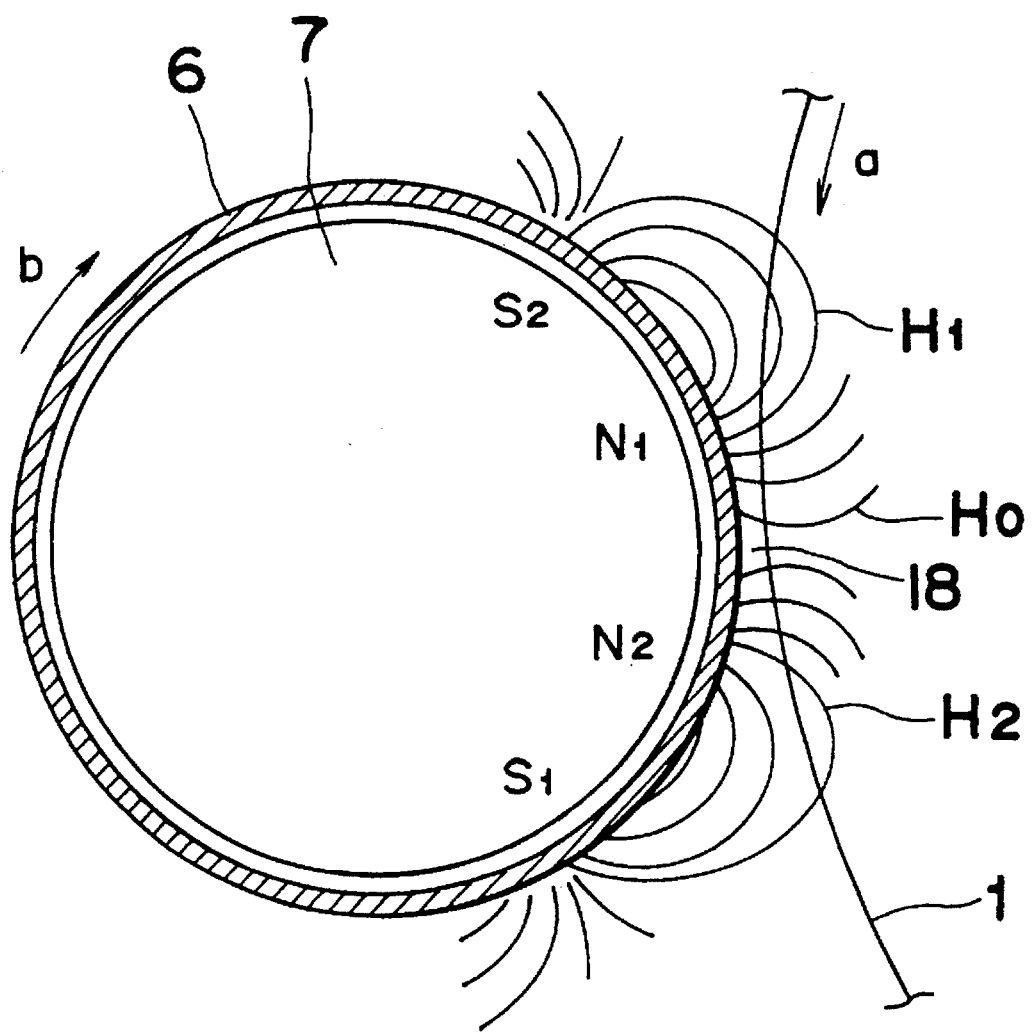
FIG. 2 shows a distribution of magnetic flux in a developing region.

The magnetic member 7, made of magnetic material and having a column-like shape, has a plurality of magnetic poles N1, N2, S1, N3, N4 and S2 located at outer periphery in this sequential order in the direction indicated by arrow B. As shown in FIG.2, the magnetic pole N1 is arranged next to the magnetic pole N2, so that a magnetic field H1 generated by the magnetic pole N1 repels a magnetic field H2 generated by the magnetic pole N2 to form a repellent magnetic field H0 therebetween. The magnetic pole N1 and the neighboring magnetic pole N2 are disposed to face a developing region 18 where the sleeve 6 confronts the photoreceptor 1. The magnetic poles N3, N4 are disposed so as to orient towards the mixing roller 12 so that a repellent magnetic field is generated therebetween. The magnetic pole S1 is disposed between the magnetic poles N2 and N3; the magnetic pole S2 is disposed between the magnetic poles N4 and N1.

The mixing roller 12, which is a conventional backet roller having an outer diameter of, for example, 36 mm, comprises a shaft 13, a plurality of paddles 14 mounted on the shaft 13, and a plurality of backets 15 disposed arround the paddles 14 at a given interval. The mixing roller 12 is housed in a passage 11 formed on one side of the developer roller 8 remote from the photoreceptor 1, and is supported so as to rotate in a direction indicated by arroew C at a revolution rate of 240 rpm.

The supply roller 17, preferably in the form of a screw roller, is arranged in a supply passage 16 formed behind and on one side of the passage 11 remote from the sleeve 8 and supported so as to rotate in a direction indicated by arrow D at a revolution rate of 192 rpm. Formed between the passages 11 and 16 is a partition 5 which extends upwardly from the lower casing 3 and has openings (not shown) defined in the vicinity of each side walls of the tank so as to communicate the passages 11 and 16 with each other.

The developer tank accommodates a mass of developer material composed of two components; namely, magnetic carrier particles of binder-type and insulative non-magnetic toner partcles. When the two components are mixed together and stirred, the toner particles are triboelectrically charged to a negative polarity and the carrier particles are triboelectrically charged to a positive polarity. Preferably, the toner particle is prepared from a mixture of 100 parts by weight of styrene-acrylic-copolymer, four parts by weight of charge controlling agent, and five parts by weight of pigment, which mixture is dry-mixed and blended while being heated, the resultant blend being cooled and then pulverized to particles of 10 µm in average particle size. Suitably, the carrier particle has an average particle size of 60 µm. The developer material is preferably of a composition containing 95 parts by weight of carrier pariticles and 5 parts by weight of toner particles.

In the developing apparatus 2 of the present invention, when the drive means such as motor (not shown) is activated, the sleeve 6, mixing roller 12, and supply roller 17 start rotation in the respective direction indicated by arrow B, C and D. Consequently, the developer material housed in the passage 16 is mixed and stirred by the rotation of the supply roller 17 while being tranported along the passage 16 in one direction, and then fed to the mixing passage 11 via one opening in the partition 5. The developer material accommodated in the passage 11 is further mixed and stirred by the continued rotation of the mixing roller 17 while being transported along the passage 11 in the opposite direction, and then fed to the passage via the other opening in the partition 5. Namely, the developer material circulates through the passages 11 and 16 and openings while being thoroughly mixed and stirred. Thus, the toner particles and the carrier particles are triboelectrically charged to respective opposite polarities. For example, the toner pariticles are charged negative while the carrier particles are charged positive. During the circulation, part of the developer material in the passage 11 is successibly scooped upwardly by the backets 15 of the mixing roller 12 and then supplied onto the developer roller 12 in the vicinity of the magnetic pole N4.

The developer material supplied to the developer roller 8 are retained on the outer surface of the sleeve 6 as magnetically attracted by the magnetic element 7, and is transported during the continued rotation of the sleeve 6 in the direction indicated by arrow B. The thickness of the developer material deposited in the sleeve 6 is restricted by the regulating plate 9 so that a specific amount of developer material can be transported through the air gap Db.

The developer material having passed through the gap Db is then carried by the sleeve 6 towards the developing region 18, opposing to the magnetic poles N1 and N2. On the other hand, the photoreceptor 1 rotating in the direction of arrow B also moves past the developing region 18 and, therefore, at the developing region 18, the developer material is applied to the photoreceptor 1 to develop an electorostatic latent image. The developer material is then transported in the direction indicated by arrow B by the continued rotation of the sleeve 6 and removed from the sleeve 6 in the region between the magnetic poles N3 and N4, by effect of the repelent magnetic field formed by the magnetic poles N3 and N4, and then mixed with the developer material being transported in the passage 11.

The following detailed description deals with the arrangement of the magnetic poles N1 and N2 and the behavior of the developer material in the developing region 18.

Figure 3:
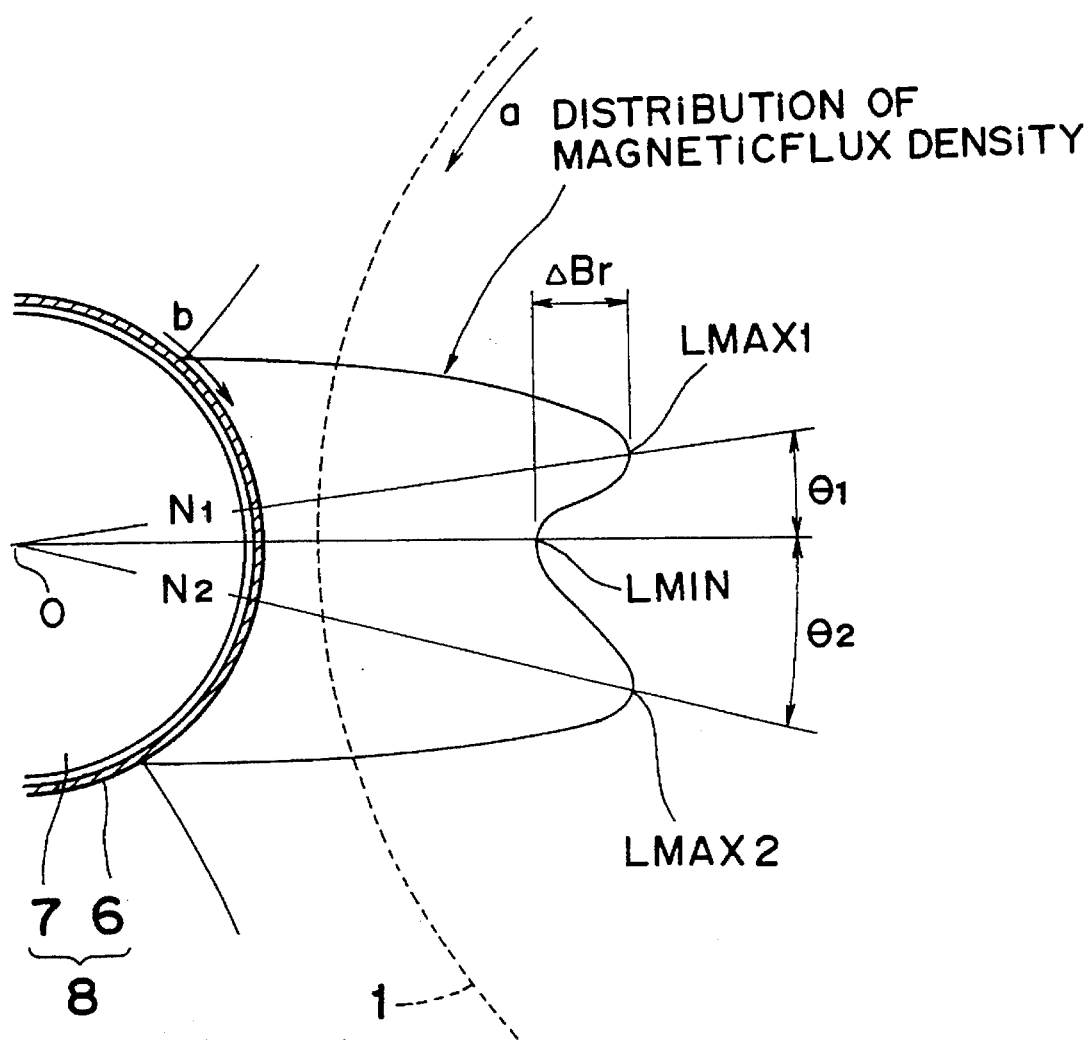
FIG. 3 shows a distribution of magnetic flux density in the developing region.

Referring to FIG. 3, there is shown part of a pattern distribution of intensity of magnetic field derived from the magnetic poles N1 and N2. The distribution pattern has two peaks and a valley; first and second local maximum points LMAX1 and LMAX2 in the local maximum magnetic fields MF(LMAX1) and MF(LMAX2) corresponding to the respective magnetic poles N1 and N2, and a local minimum point LMIN in the local minimum magnetic field MF(LMIN) located between LMAX1 and LMAX2. A central angle θ1 between a line extending from a center O of the magnetic member 7 to the first local maximum point LMAX1 and a line extending the center of the magnetic member 7 to the local minimum point LMIN is smaller than a central angle θ2 between the line extending from the center O of the magnetic member 7 to the local minimum point LMIN and a line extending from the center O of the magnetic member 7 to the second local maximum point LMAX2. Thereby, the rate of change of the magnetic flux density in a upstream side from the local minimum point LMIN with respect to the rotation of the sleeve 8 is larger than that of in a downstream side therefrom.

Cosequently, magnetic attraction force in the region from the first maximum point LMAX1 to the local minimum point LMIN is greater than that of in the region from the local minimum point LMIN to the second local maximum point LMAX2, since the magnetic attraction force linearly increases with change in magnetic flux density as shown by the following equation:

$$F \propto Br \cdot (\partial B / \partial r)$$

wherein

F: Magnetic attraction force

Br: Magnetic flux density $\partial B/\partial r$: Rate of change in magnetic flux density in the radial direction The magnetic member 7 is arranged in such a manner that the local minimum point LMIN positions on or near the line extending through both centers of the sleeve and the photoreceptor 1, such that the developer materials retained by the attraction force derived from the magnetic poles N1 and N2 are in contact with the outer surface of the photoreceptor 1.

Figure 4:
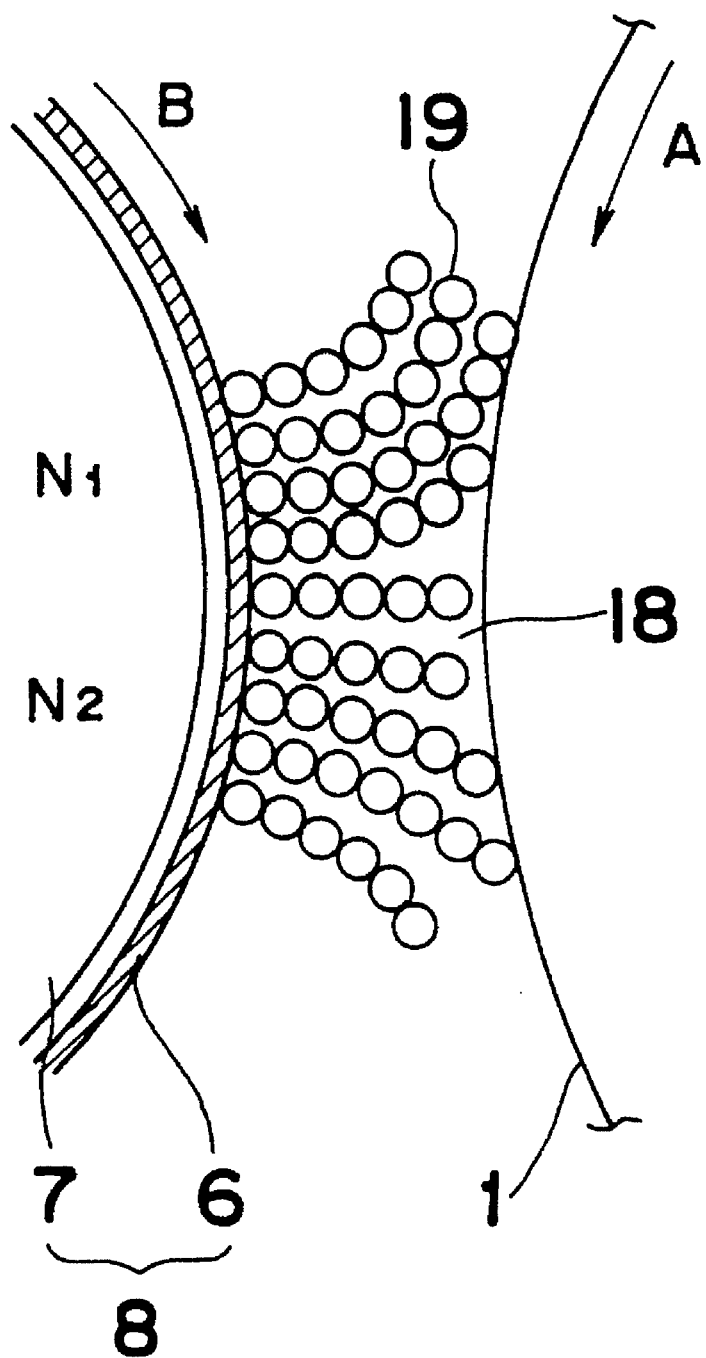
FIG. 4 is a partially enlarged cross sectional view showing the formation of magnetic brushes.

Accordingly, as shown in FIGS. 1 and 4, the developer material transported to the developing region 18 is restricted by effect of the repelent magnetic field HO so as to form a reservoir 19, above the magnetic pole N1, in which the developer material is stirred and moved in the rotational direction as well as an axial direction of the sleeve 6.

For this reason, even though a foreign matter such as a concentrated toner is caught in the gap between the sleeve 6 and the regulating plate 9 to such extent that the developer material is blocked by the foreign matter to form a strip-like region where no or little developer material exists, the region can be covered with developer material in the reservoir 19 to result in forming an image free from any defects such as white lines on the image. Further, because of the developer stirring in the reservoir 19, the toner particles frequently contact with carriers to increase electric charge thereof and touches the photoreceptor 1 so that toner images in high density of more than 1.4 can be obtained.

The developer material in the reservoir 19 is then pushed out by the developer material subsequently carried thereto and moves in the direction indicated by arrow B. The developer material carried to the region confronting to the magnetic pole N2, where the magnetic attraction force is rather weak as mentioned before, constitutes soft magnetic brushes so that they lightly contact with the photoreceptor 1. Therefore, toner image rendered visible by the developer material in the reservoir 19 passes through the developing region 18 without being scratched off by the magnetic brush made of developer material in the region confronting the magnetic pole N2.

In the region extending from the magnetic pole N1 to N2 where a repelent magnetic field H0 exist, the developer material moves with jumping or without jumping but touching the sleeve 6 in low density or sparsely. At this time, some toner particle may separate from carrier to scatter. However, the developer material in the reservoir 19 and the region facing to the magnetic pole N2 touches the photoreceptor 1 so as to prevent the scattered toner from leaking therefrom and the consequent dropping from the developer 2.

Using five developer rollers Nos. 1 to 5 (Nos. 1 and 2 being designed according to the present invention, and Nos. 3, 4 and 5 being out of the invention), a large number of images were reproduced and then evaluated with respect to the image density, reproductivity of fine line in low density, image defects, and scattering of toner particles.

In the experiments, the magnetic poles N1 and N2 of developer rollers Nos. 1 to 5 are designed as shown in Table 1.

TABLE 1

| No. | Br(LMAX1) (G) | Br(LMAX2) (G) | Br(LMIN) (G) | ΔBr (G) | δBr (G) | θ1 (°) | θ2 (°) | Rc |
|---|---|---|---|---|---|---|---|---|
| 1 | 1000 | 1000 | 750 | 250 | 250 | 13 | 18 | 13.8 |
| 2 | 1100 | 1100 | 800 | 300 | 300 | 12 | 16 | 18.8 |
| 3 | 1000 | 1000 | 750 | 250 | 250 | 12 | 12 | 20.8 |
| 4 | 1000 | 1000 | 750 | 250 | 250 | 17 | 12 | 20.8 |
| 5 | 1000 | 1000 | 750 | 250 | 250 | 30 | 30 | 8.3 |

In the Table 1, Br(LMAX1) and Br(LMAX2) represent magnetic flux densities at first and second local maximum points LMAX1 and LMAX2, respectively; ΔBr represents the difference between the magnetic flux density Br(LMAX1) at the first local maximum point LMAX1 and the magnetic flux density Br(LMIN) at the local minimum point LMIN; δBr represents the difference between the magnetic flux density Br(LMAX2) at the second local maximum point LMAX2 and the magnetic flux density Br(LMIN) at the local minimum point; Rc represents the rate of change of the magnetic flux density in the region from the local minimum point LMIN to the second local maximum point LMAX2, which is defined following equation:

$$Rc = [Br(LMAX2) - Br(LMIN)]/\theta 2$$
$$= \delta Br/\theta 2.$$

and G is an abbreviation of the unit of gauss. Other magnetic poles N3, N4, S1 and S2 were set to 500 G, 500 G, 900 G and 800 G, respectively, in each developer roller. Toner particle which can be charged to an electric charge of $-30$ μc/g was employed.

Each developer rollers Nos. 1 to 5 was arranged in such a way that the local minimum point LMIN positions on or near the line extending through both centers of each sleeve and the photoreceptor 1. As a result, in the case of the developer roller Nos. 1 to 4, the developer material attracted by magnetic poles N1 and N2 was in contact with the surface of the photoreceptor 1; while, in the case of developer roller No. 5, only the developer material attracted by the magnetic pole N1 was in contact with the surface, but the developer material attracted by the magnetic pole N2 is out of contact with the surface.

In order to evaluate the reproductivity of line in low density, an original image having fine line images in low density, that is, having an image density of 0.4 and a width of 120 μm, was employed for visual observation. The original line image is suitable to evaluate the reproductivity of line image. This is because an electrostatic latent image corresponding to the low density original image can deposit only a small quantity of toner pariticles per unit, which is readily scratched off by the contact of hard magnetic brushes to result in defects or elimination of the line.

Further, for the evaluation of image defects such as white line, foreign matter having a width of approximately 3 mm was disposed at the tip of the regulating plate in order to form on the surface of the sleeve the region where no or little developer material exists, and the presence or absence of image defects such as white line was inspected.

The evaluation as to toner scattering was carried out by arranging a vessel under the developer for receiving possible dropping toner particles and for visual observation.

The result of the experiment is shown in following Table 2, in which "o" represents that the line image was perfectly reproduced, "×" represents that the reproduced line image was rather fine in comparison with the original line or the line image was not reproduced at all.

TABLE 2

| No. | 1 | 2 | 3 | 4 | 5 |
|---|---|---|---|---|---|
| IMAGE DENSITY | 1.43 | 1.45 | 1.43 | 1.40 | 1.43 |
| PRODUCTIVITY | O | O | X | X | O |
| DEFECT OF IMAGE | NO | NO | NO | NO | NO |
| SCATTERING OF TONER | NO | NO | — | — | YES |

This proves that the image having a density of equal to or more than 1.4 can be obtained in each case. For reference, the image density of the reproduced image using prior art developer is rather low, i.e., 1.25, the developer being provided with single magnetic pole at the developing region.

The reproduced image using developer roller of No. 4 was lower than others. This is caused by the fact that the central angle θ1(=17°) of developer roller No. 4 is greater than that in others; that is, in the developer roller No. 4, the distance between the sleeve and the photoreceptor above the magnetic pole N1 is so large that the intensity of electric field at the developer material stirring zone is low in comparison with any of the other developer rollers Nos. 1, 2, 3 and 5.

The density of the reproduced image using the developer roller No. 2 is higher than that of the image reproduced by the use of the developer No. 1. This is because the developer roller No. 2 may has a higher magnetic flux density in the magnetic field MF(LMAX1), lower ΔBr, and the resultant larger repelent magnetic field between the magnetic poles N1 and N2 than those the developer roller No. 1, such that the developer roller No. 2 will stir the developer material more than the developer roller No. 2 can do above the magnetic pole N1, which results in an increased developing efficiency and the resultant higher density image.

The line images in low density were pefectly reproduced in the cases of Nos. 1 and 2; while the lines were scratched a lot in the cases of Nos. 3 and 4, which results in a lower reproductivity of the line image. This is because, in the cases of developer roller Nos. 1 and 2, the magnetic brush retained by the magnetic pole N2 in the downstream side is soft so as not to scratch off the toner image formed on the photoreceptor; while, in the cases of developer roller Nos. 3 and 4, the magnetic brush attracted by the magnetic poles N2 is rather hard enough to scratch off the toner image. Further, in the case of developer roller No. 5, the line image was perfectly reproduced without any scratching, since the developer material is out of contact of with the photoreceptor.

No defect was observed on the images in each case, since each developer roller employed in the experiments provides the neighboring magnetic poles of the same polarity facing to the developing region, which results in the elimination of the strip like region where no or little developer material exists, in the reservoir formed above the magnetic pole N1.

Toner dropping was observed only in the case of developer roller No. 5. This is because, in that case, the developer material attracted by the magnetic pole N2 is out of contact with the photoreceptor, and therefore, some toner particles separated from the developer material moving from the position above the magnetic pole N1 to the position above N2 is dropped through the gap between the photoreceptor and the magnetic brush retained by the magnetic pole N2.

Using developer roller of Nos. 1, 2 and 5, another test for printing on 100,000 sheets continuously was made with changing the environmental condition; that is, from low temperature and low humidty to high temperature and high humidity and vice versa. As a result, images having density of equal to or more than 1.4 without any image scratching could be obtained.

Figure 7:
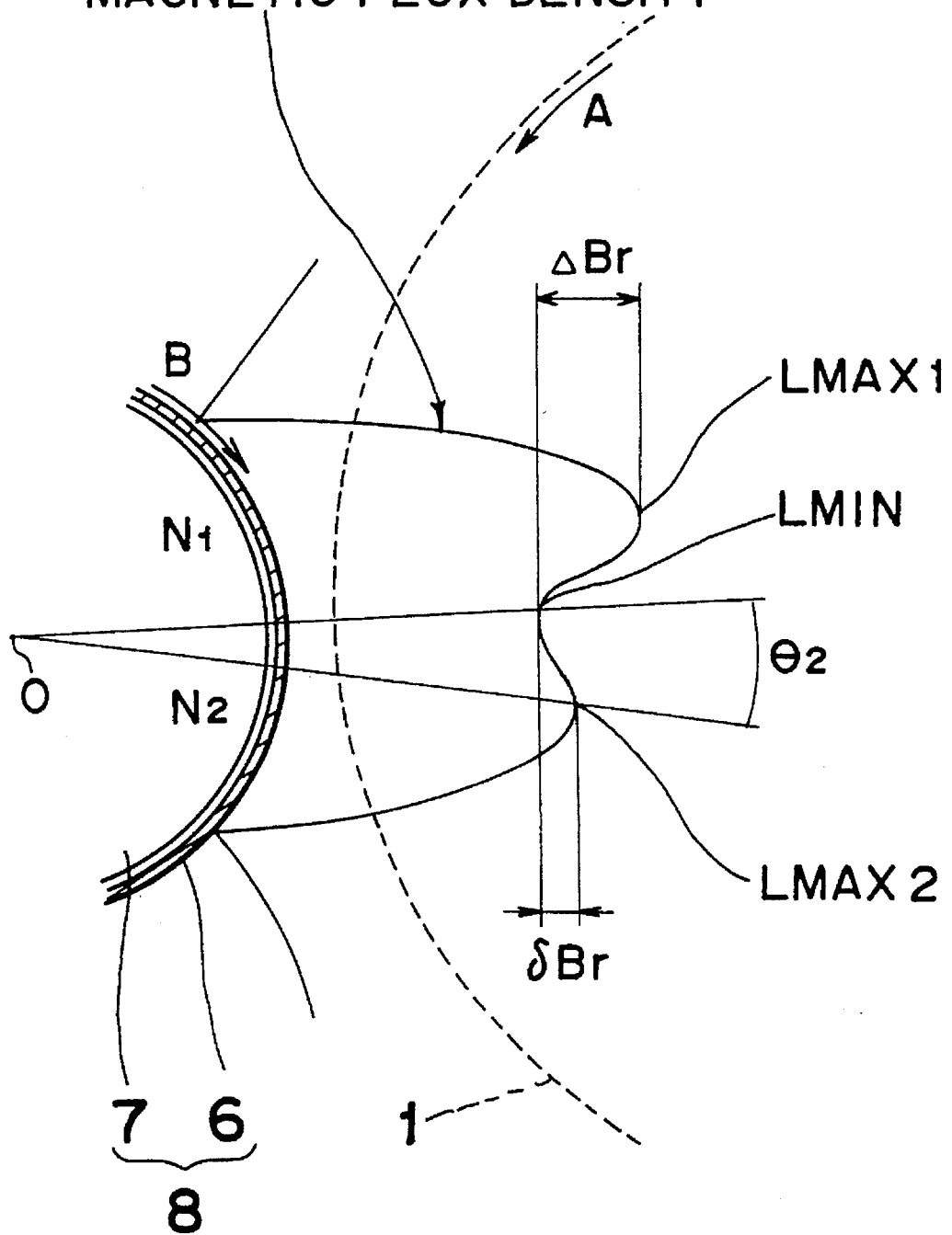
FIG. 7 shows a distribution of the magnetic flux density in the developing region according to the second embodiment.

Refering now to FIG. 7, the second embodiment of the present invention will be described hereinafter. In this embodiment, the magnetic flux density in each magnetic fields are set as follws: the magnetic flux density Br(LMAX1) is higher than Br(LMAX2) and the difference ΔBr between them is equal to or greater than 200 G/mm2; the difference δBr between the magnetic flux density Br(LMAX2) and Br(LMIN) is set to be smaller than the difference ΔBr; the rate of change Rc of the magnetic flux density in the region from the local minimum point LMIN to second local maximum point LMAX2 is 10 G/degree or below. Accodingly, the magnetic attraction force in the region from the first local maximum point LMAX1 to the local minimum point LMIN is greater than that of from the local minimum point LMIN to the second maximum point LMAX2, since the magnetic attraction force increasing with change in rate of magnetic flux density, as shown before.

The magnetic roller, which comprises a magnetic member magnetized as heretofore, is arranged in the developer in such a manner that the local minimum point LMIN positions on or near the line extending through both centers of the sleeve and the photoreceptor, so that the developer material to be retained above the magnetic poles will contact with the surface of the photoreceptor.

Consequently, the developer material transported to the developing region 18 forms the reservoir above the magnetic pole N1 to be stirred therein in any direction. Thereby, the possible strip like region where no or little developer material exists will be covered with the developer material in the accumulation so that images without any defect such as white line can be obtained constantly. Besides, an image having a high density can be reproduced, since the toner particles are frequently brought into contact with the photoreceptor which bearing an electorstatic latent image to be developed.

Furthermore, above the magnetic pole N2, the developer material retained by the lower attraction force forms soft magnetic brushes to be lightly brought into contact with the outer surface of the photoreceptor. Due to this, toner images developed on the surface of the photoreceptor are prevented from being scratched off, even thoght the images are fine line image in low density.

Further, toner particles separated from the developer material moving from the region above the magnetic pole N1 to that of above the magnetic pole N2 with jumping or without jumping in low density are prevented from leaking and then dropping by the developer material touching the surface of the photoreceptor.

Figure 5:
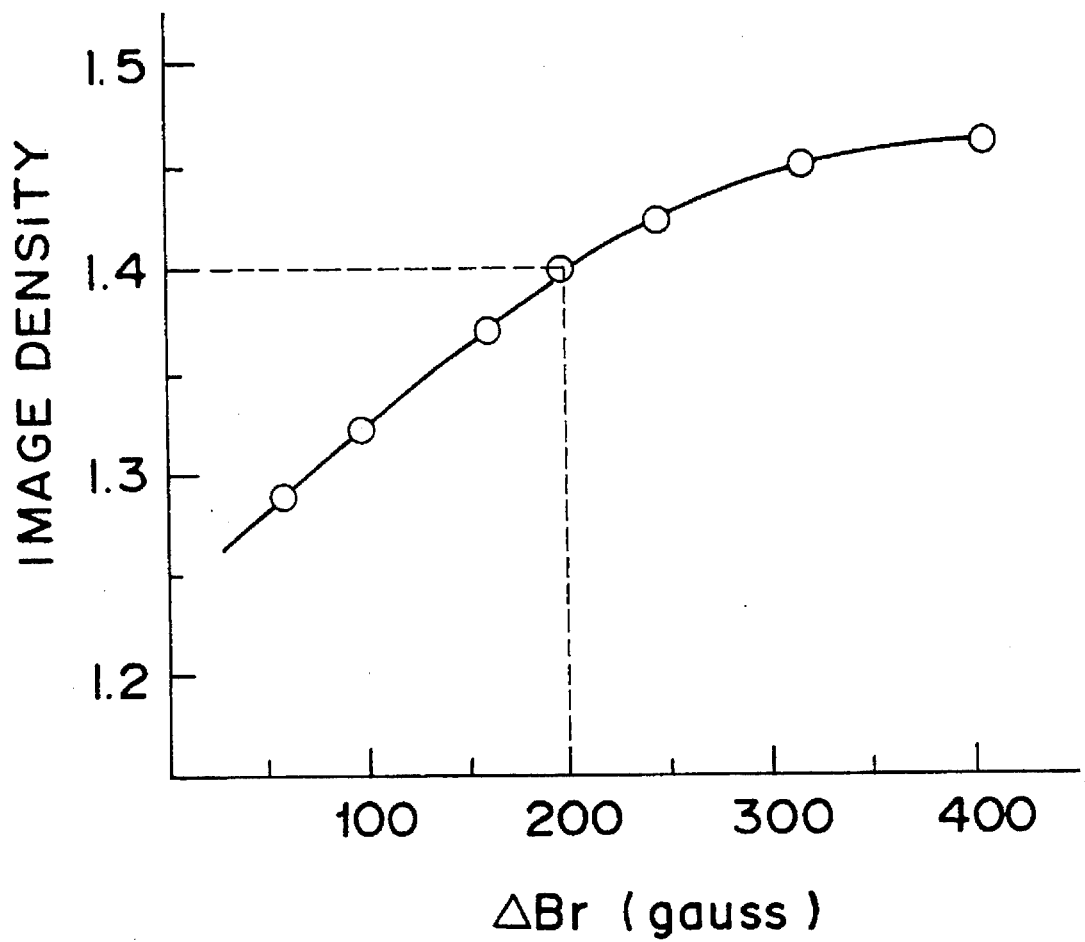
FIG. 5 is a graph showing that an image density increases in keeping with a difference of magnetic flux density between upstream and downstream local maximum points.

FIG. 5, which is obtained by the experiments, and which shows the relation between the difference of the magnetic flux density of ΔBr and the reproduced image density, proves that the reproduced image density increases with increase in difference ΔBr, and the image having a density of equal to or more than 1.4 can be obtained on condition that the difference ΔBr is over 200 G.

The image scratching was tested using original image having fine line images of low density, i.e., that having a density of 0.4 and a width of 120 μm, with varying the changing rate of magnetic flux density Rc.

Figure 6:
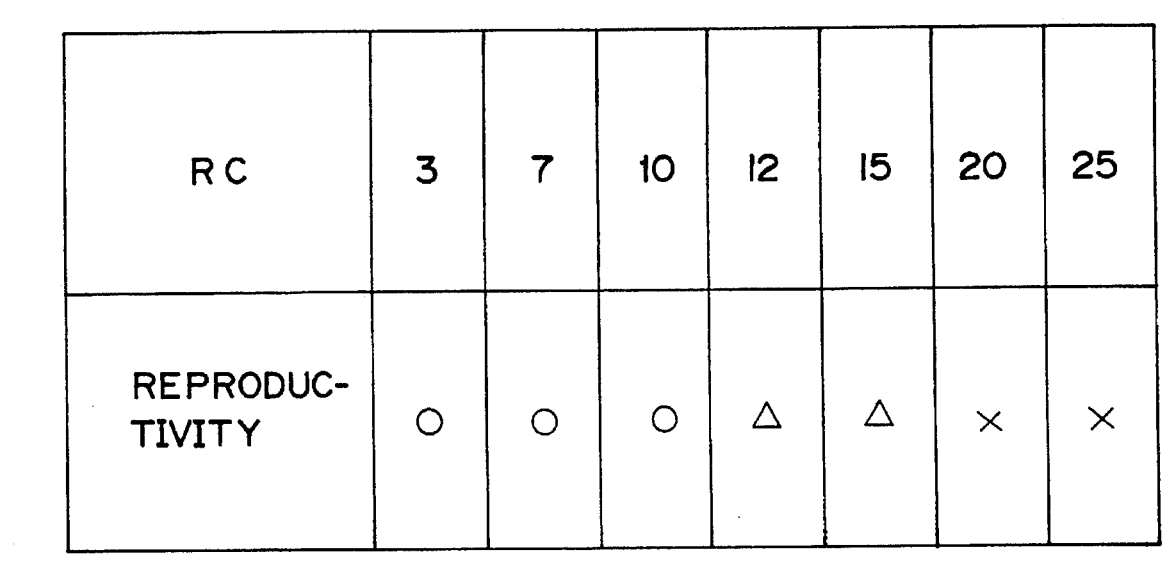

The result is illustrated in FIG.6, in which "o" represents that the lines were perfectly reproduced, "Δ" represents that part of the reproduced lines were scrathed off, and "×" represents that no or little line image was reproduced. Thus it is clear that the original lines are reproduced clearly when Rc is of equal or less 10 G/degree, the scratching gradually increases in keeping with Rc and the lines are not reproduced perfectly when Rc is of more than 20 G/degree.

Using four developer rollers Nos. 6 to 9 having a respective magnetic member as shown in Table 3; Nos. 6 and 7 being designed according to the second embodiment, while Nos. 8 and 9 being out of this embodiment. A great number of images were reproduced and then evaluated with respect to the reproduced image density, image defect such as a white line, and scattering, in a manner similar to that of described heretofore.

TABLE 3

| No. | Br(LMAX1) (G) | Br(LMAX2) (G) | Br(LMIN) (G) | ΔBr (G) | δBr (G) | θ1 (°) | θ2 (°) | Rc |
|---|---|---|---|---|---|---|---|---|
| 6 | 1000 | 930 | 800 | 200 | 130 | 13 | 18 | 7.2 |
| 7 | 1100 | 750 | 650 | 350 | 100 | 14 | 16 | 6.3 |
| 8 | 1000 | 1000 | 800 | 200 | 200 | 14 | 13 | 15.4 |

TABLE 3-continued

| No. | Br(LMAX1) (G) | Br(LMAX2) (G) | Br(LMIN) (G) | ΔBr (G) | δBr (G) | θ1 (°) | θ2 (°) | Rc |
|---|---|---|---|---|---|---|---|---|
| 9 | 1000 | 1000 | 740 | 260 | 260 | 13 | 13 | 20.2 |

Other conditions were set in the same as that of the similar experiment in the first embodiment.

The magnetic roller, which comprises a magnetic member magnetized as heretofore, is arranged in the developer in such a manner that the local minimum point LMIN positions on or near the line extending through both centers of the sleeve and the photoreceptor, so that the developer material to be retained above the magnetic poles will contact with the surface of the photoreceptor.

As a result, with the developer housing the developer roller designed according to the second embodiment, the images can be reproduced with an increased image density equal to or more than 1.4; while the image density of the reproduced image using the prior art developer is rather low, i.e., 1.25, the developer being provided with single magnetic pole at the developing region.

Further, a continuous copying test which reproducing a same image on 100,000 sheets were made for the developer units housing developer roller of the present embodiment with changing humidty condition. As a result, the images were constantly reproduced with an increased density equal to or more than 1.4 and with no scrathing.

Further, no image defect or scratching was found in the images reproduced by using the developer according to the present embodiment.

Moreover, no scattering of toner particles was comfirmed in any case.

Figure 8:
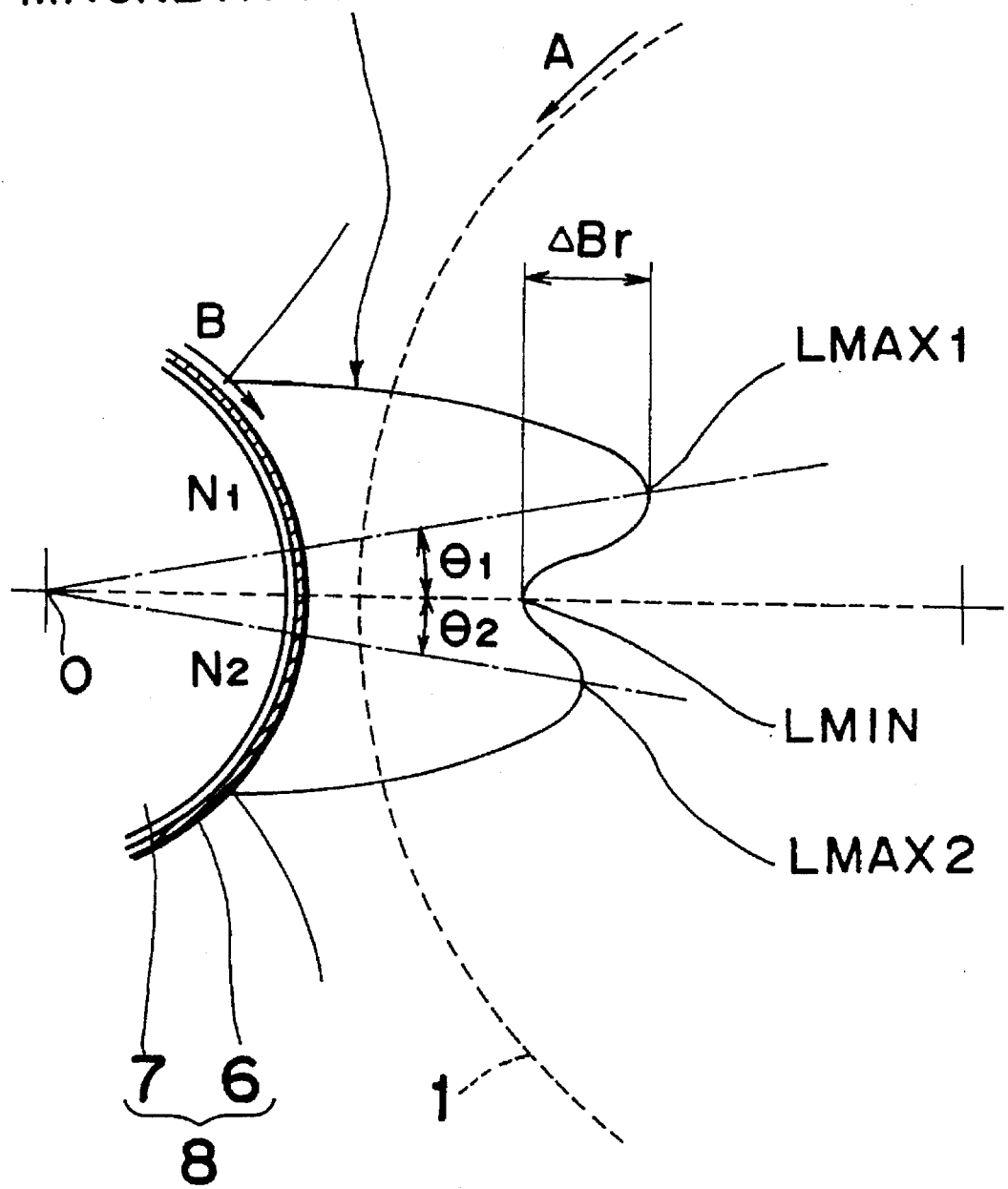
FIG. 8 shows a distribution of the magnetic flux density in the developing region according to the third embodiment.

Refering to now to FIG. 8, the third embodiment of the present invention will be described hereinafter. In this embodiment, the magnetic flux densities of said points have the following relation:

Br(LMAX1)>Br(LMAX2)>Br(LMIN)

Further, the rate of change of the magnetic flux density in the region from the first local maximum point LMAX1 to the local minimum point LMIN is greater than that of in the region from the local minimum point LMIN to the second local maximum point LMAX2, and therefore, the magnetic attraction force in the region from the first local maximum point LMAX1 to the local minimum point LMIN is greater than that of in the region from the local minimum point to the second local maximum point LMAX2.

The magnetic roller magnetized as heretofore, is arranged in the developer in such a manner that the local minimum point LMIN positions on or near the line extending through both centers of the sleeve and the photoreceptor, so that the developer material to be retained above the magnetic poles will contact with the surface of the photoreceptor.

Consequently, as is the case with the embodiments described heretofore, images having a sufficient density and without scratching nor defect can be obtained. Besides, toner particles separated from the developer material moving in the developing region will be prevented from leaking and then dropping therefrom.

Using five developer rollers Nos. 10 to 14 having magnetic members magnetized as shown in Table 4 (Nos. 10 and 11 is designed according to present embodiment, while Nos. 12, 13 and 14 are out of this embodiment), a great number of images were reproduced and then evaluated with respect to the reproduced image density, image defects such as white line, and scattering, in a manner similar to that described heretofore.

TABLE 4

| No. | Br(LMAX1) (G) | Br(LMAX2) (G) | Br(LMIN) (G) | ΔBr (G) | δBr (G) | θ1 (°) | θ2 (°) | Rc |
|---|---|---|---|---|---|---|---|---|
| 10 | 1250 | 1100 | 900 | 350 | 200 | 13 | 13 | 26.9 |
| 11 | 1200 | 990 | 900 | 310 | 90 | 13 | 13 | 23.8 |
| 12 | 1050 | 1230 | 850 | 200 | 380 | 13 | 13 | 15.4 |
| 13 | 1150 | 1150 | 900 | 250 | 250 | 13 | 13 | 19.2 |
| 14 | 1220 | 1020 | 900 | 320 | 120 | 12 | 30 | 10.7 |

Other conditions were set in the same as that of the similar experiment in the first embodiment.

Each developer roller Nos. 10 to 14 was arranged in such a way that the local minimum point LMIN positions on the line extending through both centers of the sleeve and the photoreceptor 1. As a result, in the case of each of the developer roller Nos. 10 to 13, the developer materials attracted by magnetic poles N1 and N2 were in contact with the surface of the photoreceptor 1; while, in the case of developer roller No. 14, only the developer material attracted by the magnetic pole N1 was in contact with the surface but the developer material attracted by the magnetic pole N2 is out of contact with the surface.

The result of the experiment is shown in following Table 5.

TABLE 5

| No. | 10 | 11 | 12 | 13 | 14 |
|---|---|---|---|---|---|
| IMAGE DENSITY | 1.47 | 1.45 | 1.40 | 1.43 | 1.45 |
| PRODUCTIVITY | Δ | ○ | X | X | ○ |
| DEFECT OF IMAGE | NO | NO | NO | NO | NO |
| SCATTERING OF TONER | NO | NO | — | — | YES |

This makes it clear that, for each developer housing the develper roller Nos. 10 to 15, the images can reproduced with an increased image density of equal to or more than 1.4.

The image reproduced using the developer roller of No. 12 is lower than that reproduced using any of the others. This is because the difference ΔBr is smaller than others. It is proved that the more the ΔBr increases, the stronger the holding force of developer material in the region above the magnetic pole N1 as well as the repelent magnetic force become, which leads to an enhanced stirring of the developer material above the magnetic pole N1 and an efficient developing.

In the case of developer roller No. 10, a little scratching of the line image was observed, but it can be practically negligible, while in case of the developer roller No. 11, the low density line image was reproduced almost perfectly. This is because the intensity of the magnetic flux density Br(LMAX2) in the magnet rolle No. 10 is stronger than that of in each magnetic roller Nos. 11 and 14 and then developer material above the magnetic pole N2 is intensely attracted to the sleeve rather than that of in the magnetic rollers Nos. 11 and 14. In contrast thereto, in the case of each developer roller Nos. 12 and 13, the low density line images were scratched off considerably to result in poor image. This proves that, in the case of developer rollers 10 and 11, the magnetic brush holded above the magnetic pole N2 is soft so that toner images on the photoreceptor can be retained without being scratching off; while in the case of each developer roller Nos. 12 and 13, the magnetic brushes above the magnetic pole are hard to result in the scratching the toner images off from the photoreceptor. Further, in the case of developer roller No. 14, the line image was perfectly reproduced without any scratching, since the developer material is out of contact of with the photoreceptor.

No defect was found on the images in each case because of the existence of the reservoir formed by the neighboring magnetic poles of same polarity.

Toner dropping was observed only in the case No. 14. This is because, in that case, the developer material attracted by the magnetic pole N2 is out of contact with the photoreceptor, and therefore, some toner particles separated from the developer material moving from the position above the magnetic pole N1 to the position above N2 is dropped through the gap between the photoreceptor and the magnetic brush retained by the magnetic pole N2.

Using each developer roller of Nos. 10, 11 and 14, another test of continuous printing on 100,000 sheets was made with changing the environmental condition; that is, from low temperature and low humidty to high temperature and high humidity and vice versa. As a result, images having density of equal to or more than 1.4 without any image scratching could be obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A developing apparatus comprising a stationary magnetic member having a plurality of magnetic poles extending in a direction axially of the magnetic member, and a non-magnetic rotatable sleeve enclosing the magnetic member therein, wherein a developer material is retained upon a periphery of the sleeve by effect of a magnetic force of attraction generated by the magnetic member during a rotation of the sleeve so as to be brought into contact with an electrostatic latent bearing member, two of the magnetic poles of the magnetic member which are positioned so as to confront a nipping region between the sleeve and a photoreceptor in neighboring relation with each other are of same polarity, and produce a distribution of magnetic flux density having a local minimum point, a first local maximum point located upstream of the local minimum point with respect to rotation of the sleeve, and a second local maximum point located downstream of the local minimum point with respect to the rotation of the sleeve, a central angle $\theta 1$ between a line extending from a center of the magnetic member to the first local maximum point and a line extending from the center of the magnetic member to the local minimum point being smaller than a central angle $\theta 2$ between the line extending from the center of the magnetic member to the local minimum point and a line extending from the center of the magnetic member to the second local maximum point; and the developer materials retained by an attraction force generated by the neighboring magnetic poles of same polarity are kept in contact with the electrostatic latent image bearing member.

2. A developing apparatus comprising a stationary magnetic member having a plurality of magnetic poles extending in a direction axially of the magnetic member, and a non-magnetic rotatable sleeve enclosing the magnetic member therein, wherein a developer material is retained upon a periphery of the sleeve by effect of a magnetic force of attraction generated by the magnetic member during a rotation of the sleeve so as to be brought into contact with an electrostatic latent bearing member, two of the magnetic poles of the magnetic member which are positioned so as to confront a nipping region between the sleeve and a photoreceptor in neighboring relation with each other are of same polarity, and produce a distribution of magnetic flux density having a local minimum point, a first local maximum point located upstream of the local minimum point with respect to rotation of the sleeve, and a second local maximum point located downstream of the local minimum point with respect to the rotation of the sleeve, a difference between a maximum flux density of the first local magnetic point and that of the local minimum point being equal to or more than 200 gauss and a rate of change of magnetic flux density from said local minimum point to said second local maximum point being equal to or less than 10 gauss/degree; and the developer materials retained by an attraction force generated by neighboring magnetic poles of same polarity are kept in contact with the electorostatic latent image bearing member.

3. A developing apparatus comprising a stationary magnetic member having a plurality of magnetic poles extending in a direction axially of the magnetic member, and a non-magnetic rotatable sleeve enclosing the magnetic member therein, wherein a developer material is retained upon a periphery of the sleeve by effect of a magnetic force of attraction generated by the magnetic member during a rotation of the sleeve so as to be brought into contact with an electrostatic latent bearing member, two of the magnetic poles of the magnetic member which are positioned so as to confront a nipping region between the sleeve and a photoreceptor in neighboring relation with each other are of same polarity, and produce a distribution of magnetic flux density having a local minimum point, a first local maximum point located upstream side of the local minimum point with respect to the rotation of the sleeve, and a second local maximum point located downstream side of the local minimum point with respect to the rotation of the sleeve, magnetic flux densities of the first and second local maximum points and local minimum point have a following relation below:

$$Br(LMAX1) > Br(LMAX2) > Br(LMIN)$$

wherein
  Br(LMAX1) is a magnetic flux density at said first local maximum point;
  Br(LMAX2) is a magnetic flux density at said second local maximum point; and Br(LMIN) is a magnetic flux density at said local minimum point;

and the developer materials retained by a attraction force generated by the neighboring magnetic poles are kept in contact with the electorostatic latent image bearing member.

4. A developer apparatus according to claim 3 wherein a difference between a magnetic flux density of the first local maximum point and that of local minimum point is equal to or more than 200 gauss and a rate of change of magnetic flux density from the local minimum point to the second local maximum point is equal to or less than 10 gauss/degree.

5. A developer apparatus according to claim 4 wherein a central angle $\theta1$ between a line extending from a center of the magnetic member to the first local maximum point and a line extending the center of the magnetic member to the local minimum point is smaller than a central angle $\theta2$ between said line extending from the center of the magnetic member to the local minimum point and a line extending from the center of the magnetic member to the second local maximum point.

* * * * *